Dec. 1, 1931.　　　V. L. OSGOOD　　　1,834,416

ELECTRIC CONTROLLING APPARATUS

Filed March 20, 1928

INVENTOR.
Victor L. Osgood
BY
Edwards, Sager & Bower
his ATTORNEYS.

Patented Dec. 1, 1931

1,834,416

UNITED STATES PATENT OFFICE

VICTOR L. OSGOOD, OF NEW YORK, N. Y., ASSIGNOR TO WARD LEONARD ELECTRIC COMPANY, A CORPORATION OF NEW YORK

ELECTRIC CONTROLLING APPARATUS

Application filed March 20, 1928. Serial No. 263,142.

This invention relates to electric controlling apparatus wherein the output voltage is regulated at approximately a constant amount and is particularly applicable to systems wherein an alternating current supply is rectified to a direct current output. It is especially applicable to a system for serving as a B eliminator in radio receivers where the source is alternating current energy. In systems of this character, it is especially desirable that the output voltage be maintained substantially constant under varying supply voltages and under varying output current or load.

The main object of this invention is to provide an improved method and apparatus for maintaining the output voltage constant in systems of the above character, and to accomplish this by a simple form of apparatus which may be economically manufactured and assembled, and which will automatically control the output voltage within close limits regardless of variations in the supply voltage and in the output. Other objects and advantages of this invention will be understood from the following description and accompanying drawings.

Figure 1:
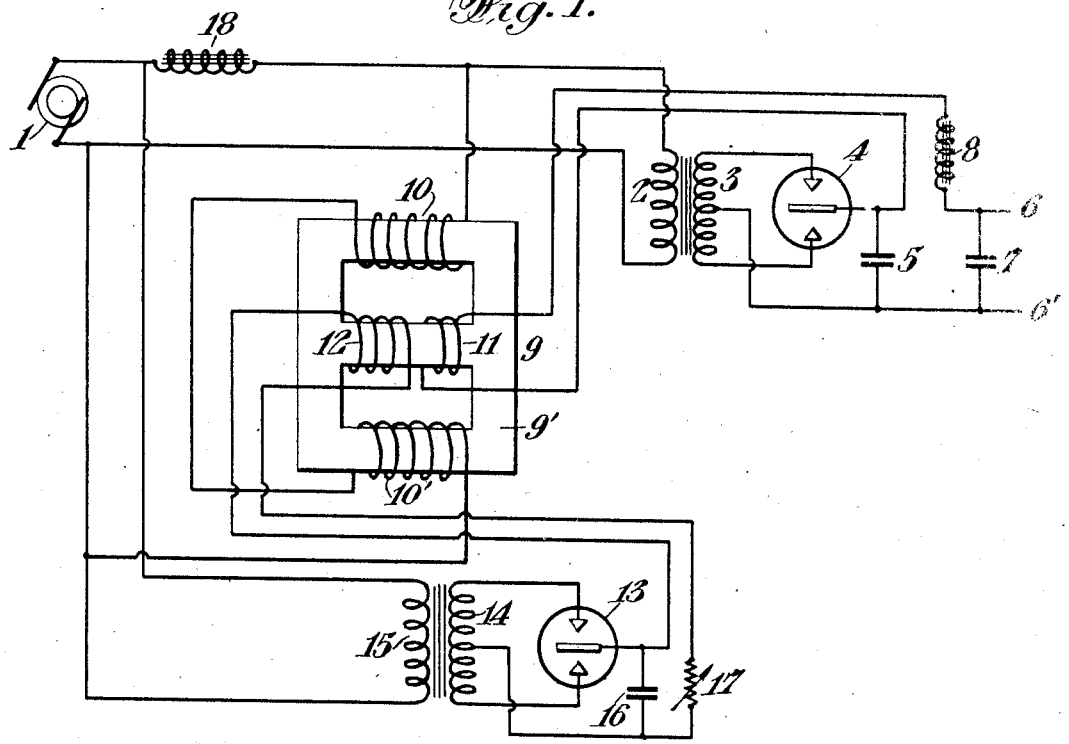
Figure 2:
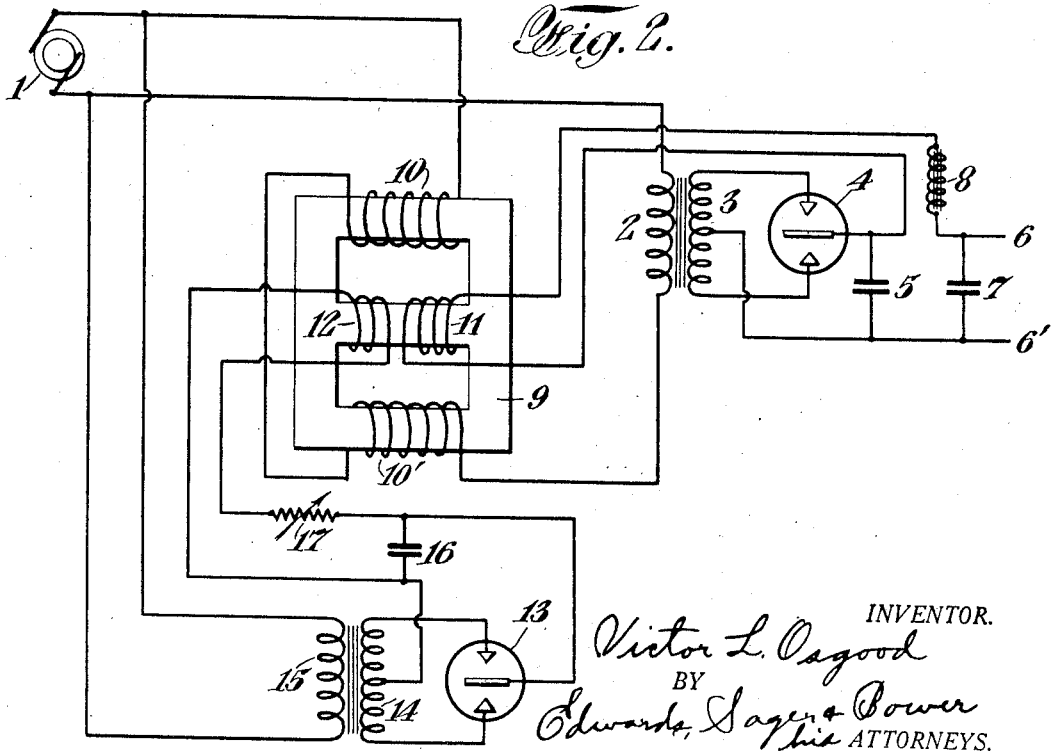

Fig. 1 is a diagram illustrating one embodiment of this invention; and Fig. 2 is a diagram illustrating a modification.

Referring to Fig. 1, a source of alternating current energy 1 supplies current to a transformer having a primary winding 2 and a secondary winding 3. The latter supplies A. C. energy to any suitable form of rectifier 4, indicated as a full wave rectifier, having two of its terminals (anodes) connected to the terminals of the secondary 3 and an intermediate terminal connected to a mid-point of the secondary 3 through a usual filter condenser 5. The direct current output lines 6, 6' have connected between them another filter condenser 7; and in series in the line 6 is indicated a usual filter reactor 8.

The regulating and controlling means comprises a reactor 9 made up in the form of a laminated core 9' having three parallel legs joined together at opposite ends by crosspieces, as indicated in the drawings. The outer legs have two coils 10, 10' which are shown connected in series with each other across the alternating current supply lines. These coils 10, 10' act cumulatively in magnetizing the core of the reactor and in some cases may be connected in parallel instead of in series with each other.

The middle leg of this reactor carries two windings excited by direct current which act in opposition to each other in magnetizing the core. These windings may be superimposed one over the other, or may be side by side, or somewhat displaced from each other and still secure the desired results. One of these windings 11 is connected in series in the direct current output of the apparatus, being shown connected in series with the D. C. line 6. The other winding 12 obtains its D. C. excitation from the output of another controlling rectifying unit comprising a suitable rectifier 13 supplied with A. C. from the secondary 14 of a transformer having its primary 15 connected to the supply lines of the alternating source 1. A filter condenser 16 is shown connected across the D. C. output circuit of this rectifier; and an adjustable resistance 17 is in series with the winding 12.

An impedance device 18 is connected in series with one of the alternating current supply lines from the source 1 leading to the primary 2 of the transformer supplying the energy for the direct current output circuit. The impedance device 18 will have its reactance and resistance relatively proportioned to give the best regulating effect in conjunction with the particular apparatus with which it is used and may be adjusted to the desired proper fixed values, after which it will properly function without further adjustment.

Referring to the reactor 9, the excitation of the winding 12 from the controlling rectifier 13 predominates over the opposing excitation of the winding 11 which is connected in series with the D. C. output circuit.

In operation, assuming that the A. C. supply voltage increases, the output of the controlling rectifier 13 will be increased and thus cause an increased excitation of the winding 12. As this winding predominates over the excitation due to the winding 11, the direct current excitation of the core of the reactor 9 will be increased and thus decrease the reactance of the reactor 9. This reduced reactance will permit an increased current to pass through the A. C. windings 10, 10' of the reactor, increasing the load on the A. C. source 1 and cause an increased drop of potential across the series reactor 18. With the parts of the apparatus properly relatively proportioned, the increased drop in the series reactor 18 will compensate for the increase in voltage of the A. C. source, resulting in the voltage across the D. C. output lines 6, 6' being unaffected by the voltage increase at the source. Similarly, when a decrease in voltage at the source occurs, the excitation of the predominating winding 12 is decreased, causing an increase in the reactance of the reactor 9 and a reduction of current in the windings 10, 10'. This reduces the drop in the device 18 sufficiently to compensate for the reduction in voltage of the source so that the voltage of the D. C. lines 6, 6' is unaffected. Thus the voltage of the D. C. output circuit is maintained substantially constant regardless of voltage variations in the alternating current supply lines.

Assuming now that the load on the D. C. output lines 6, 6' be increased; this will cause the excitation of the winding 11 to increase; and owing to the excitation of this winding being in opposition to the predominating exciting winding 12, the direct current excitation of the reactor 9 is decreased which increases the reactance of the reactor and decreases the current which is permitted to flow through the A. C. windings 10, 10'. This reduction of current taken from the source of the A. C. supply lines causes the drop in the series reactor 18 to be lessened and thereby permit a corresponding increased voltage to be supplied to the primary 2 which in turn causes the voltage supplied to the D. C. lines 6, 6' to be increased sufficiently to compensate for the drop caused by the increased D. C. load. Similarly, a decrease in the direct current load will cause a decrease in the current passing through the winding 11 which results in a stronger direct current magnetization of the reactor 9 with a corresponding decrease in its reactance. This permits an increased current to flow in the windings 10, 10', increasing the potential drop in the device 18 and correspondingly reducing the voltage supplied to the primary winding 2 and thus compensate for the decreased direct current load.

In Fig. 2 the parts corresponding to the apparatus in Fig. 1 are similarly numbered, but the combination in Fig. 2 differs from that of Fig. 1 in that the series reactor 18 becomes unnecessary. In Fig. 2 the A. C. windings 10, 10' are connected in series with the primary 2 of the transformer supplying the load; and also the series D. C. load winding 11 of the reactor predominates in its excitation of the core over that caused by the winding 12 which opposes the excitation of the winding 11.

Considering Fig. 2, when the voltage of the supply line increases, the excitation of the winding 12 increases, which decreases the D. C. excitation of the reactor 9, causing its reactance to increase. This reduces the current permitted to flow in the windings 10, 10', and likewise the current permitted to flow in the primary winding 2 of the transformer. This reduced current may be made such as to compensate for the increased supply voltage. Similarly, a decreased supply voltage permits a compensating increased current to pass through the windings 10, 10' of the reactor 9 and the primary winding 2 which compensates for the decrease in the A. C. supply voltage and maintains the D. C. output voltage substantially constant.

In Fig. 2, when the D. C. load increases, the D. C. magnetization of the reactor 9 increases, reducing its reactance and permitting more current to flow through the windings 10, 10' and the primary 2 of the load transformer thus tending to increase the voltage supplied to the D. C. output lines to compensate for the increased load. Similarly, if the D. C. load decreases, the current in the winding 11 is decreased, reducing the D. C. magnetization of the reactor 9 and increasing its reactance. This reduces the current flowing in the windings 10, 10' and the primary 2 of the load transformer thus reducing the voltage supplied to the D. C. output lines to compensate for the effects of the decrease in the load.

Although this invention has been described with reference to certain embodiments, it will be understood that various other modifications may be made without departing from the scope of this invention.

I claim:

1. The combination of an alternating current supply circuit, a rectifier for supplying a load with direct current, and a reactor for controlling the voltage of the direct current output, said reactor having an alternating current winding excited from the alternating current source and a direct current exciting winding subjected to a voltage corresponding to that of the alternating current source independently of the direct current load circuit, and a winding in the supply circuit subjected to load energy, said first-named winding being in series with said last-named winding.

2. The combination of an alternating current supply circuit, a rectifier for supplying a load with direct current, and a reactor for controlling the voltage of the direct current output, said reactor having an alternating current winding excited from the alternating current source, a direct current exciting winding dependent upon the voltage of the alternating current source and a direct current exciting winding dependent upon the direct current load, and a winding in the supply circuit subjected to load energy, said first-named winding being in series with said last-named winding.

3. The combination of an alternating current supply circuit, a rectifier for supplying a load with direct current, and a reactor for controlling the voltage of the direct current output, said reactor having an alternating current winding excited from the alternating current source, a direct current winding in series with the direct current load and a second direct current winding dependent upon the voltage of the alternating circuit, and a winding in the supply circuit subjected to load energy, said first-named winding being in series with said last-named winding.

4. The combination of an alternating current supply circuit, a rectifier for supplying a load with direct current, and a controlling reactor having differential direct current windings for energizing the reactor core and an alternating current winding for energizing said core, and means for causing the excitation of one of said direct current windings to be dependent upon the direct current load and of the other of said direct current windings to be dependent upon variations in the alternating current supply, and a winding in the supply circuit subjected to load energy, said first-named winding being in series with said last-named winding.

5. The combination of an alternating current supply circuit, a rectifier for supplying a load with direct current, a controlling reactor having a winding supplied with energy from the alternating current supply circuit, and a controlling rectifier supplied with energy from the alternating current supply circuit, said reactor having another winding supplied with direct current from said controlling rectifier, and a winding in the supply circuit subjected to load energy, said first-named winding being in series with said last-named winding.

6. The combination of an alternating current supply circuit, a rectifier for supplying a load with direct current, a controlling reactor having windings excited from the alternating current supply and from the direct current load, and a controlling rectifier supplied with energy from the alternating current supply circuit and supplying direct current to another winding of said reactor, and a winding in the supply circuit subjected to load energy, said first-named winding being in series with said last-named winding.

7. The combination of an alternating current supply circuit, a rectifier for supplying a load with direct current, a controlling rectifier supplied with energy from the alternating current supply circuit, and a controlling reactor having a plurality of windings, one of said windings being excited with alternating current energy from said supply circuit, another of said windings being supplied with direct current energy derived from said first-named rectifier and a third winding being supplied with energy from said controlling rectifier, and a winding in the supply circuit subjected to load energy, said winding excited with alternating current energy being in series with said last-named winding.

8. The combination of an alternating current supply circuit, a rectifier for supplying a load with direct current, a controlling rectifier supplied with energy from the alternating current supply circuit, and a controlling reactor having a plurality of windings, one of said windings being excited with alternating current energy from said supply circuit, another of said windings being supplied with direct current energy derived from said first-named rectifier and a third winding being supplied with energy from said controlling rectifier, the direction of current in said last two named windings being in opposition to each other as regards direct current magnetization of said reactor, and a winding in the supply circuit subjected to load energy, said winding excited with alternating current energy being in series with said last-named winding.

9. The combination of an alternating current supply circuit, a rectifier for supplying a load with direct current, a device for supplying direct current dependent upon the voltage of said alternating current supply circuit, and a controlling reactor having a plurality of windings, one of said windings being supplied with alternating current derived from said alternating current supply circuit, a second winding supplied with direct current dependent upon the load on said rectifier and a third winding supplied with direct current from said device, and a winding in the supply circuit subjected to load energy, said winding excited with alternating current energy being in series with said last-named winding.

10. The combination of an alternating current supply circuit, a rectifier for supplying a load with direct current, a device dependent upon the voltage of the alternating current supply circuit for supplying direct current energy, and a controlling reactor having a core and windings, said core having one leg energized by windings excited by the load current from said rectifier and from said device respectively, and said core having a winding on another leg excited by alternating current derived from said alternating current supply circuit, and a winding in the supply circuit subjected to load energy, said winding excited with alternating current energy being in series with said last-named winding.

11. The combination of an alternating current supply circuit, a rectifier for supplying a load with direct current, a device dependent upon the voltage of the alternating current supply circuit for supplying direct current energy, and a controlling reactor having a core and windings, said core having windings on a central leg excited by load current of said rectifier and the current from said device respectively, and said core having a winding on an outer leg excited by alternating current from said supply circuit, and a winding in the supply circuit subjected to load energy, said winding excited with alternating current energy being in series with said last-named winding.

12. The combination of alternating current supply circuit, a rectifier for supplying a load with direct current, a device dependent upon the voltage of the alternating current supply circuit for supplying direct current energy, and a controlling reactor having a core and windings, said core having windings on one portion thereof excited by the load current from said rectifier and current from said device respectively, but in opposition to each other, and said core having a winding on another portion thereof excited by alternating current derived from said supply circuit, and a winding in the supply circuit subjected to load energy, said winding excited with alternating current energy being in series with said last-named winding.

13. The combination of an alternating current supply circuit, a rectifier for supplying a load with direct current, a device dependent upon the voltage of the alternating current supply circuit for supplying direct current energy, and a controlling reactor having a core and windings, said core having windings on one portion thereof excited by the load current from said rectifier and current from said device respectively, but in opposition to each other, and said core having a winding on another portion thereof excited by alternating current derived from said supply circuit, said last named winding being dependent upon the voltage of said supply circuit, and a winding in the supply circuit subjected to load energy, said winding excited with alternating current energy being in series with said last-named winding.

14. The combination of an alternating current supply circuit, a rectifier for supplying a load with direct current, a device dependent upon the voltage of the alternating current supply circuit for supplying direct current energy, and a controlling reactor having a core and windings, said core having windings on one portion thereof excited by the load current from said rectifier and current from said device respectively, but in opposition to each other, and said core having a winding on another portion thereof excited by alternating current derived from said supply circuit, said last named winding being dependent upon the voltage of said supply circuit, and a series reactor in said supply circuit in series with said last-named winding in a circuit across the supply circuit.

15. The combination of an alternating current supply circuit, a rectifier for supplying a load with direct current, a controlling rectifier dependent upon the voltage of said supply circuit, and a controlling reactor having a three legged core and windings thereon, two of said windings being excited by direct current in opposition to each other and on the central leg of said core, one of said windings being in series with the load of said first named rectifier and the other of said windings being supplied with current from said controlling rectifier, and a winding on another leg of said core subjected to alternating current energy derived from said supply circuit, and a winding in the supply circuit subjected to load energy, said winding excited with alternating current energy being in series with said last-named winding.

VICTOR L. OSGOOD.